United States Patent Office 3,532,488
Patented Oct. 6, 1970

---

3,532,488
N-CYCLO-HEXYLDITHIOCARBAMATES AS SELECTIVE HERBICIDES IN RICE
Robert Forest Husted, Florissant, Mo., and John Joseph D'Amico, Dunbar, W. Va., assignors to Monsanto Company, St. Louis, Mo., a corporation of Delaware
No Drawing. Filed Nov. 25, 1966, Ser. No. 596,758
Int. Cl. A01n 9/12
U.S. Cl. 71—101                                 9 Claims

ABSTRACT OF THE DISCLOSURE

Alkyl and allyl esters of N-alkyl- and N-allyldithiocyclohexanecarbamic acids wherein the N-alkyl substituent contains two or three carbon atoms and the S-alkyl substituent contains two to four carbon atoms, the sum of the carbon atoms in the nitrogen and sulfur substituents being five or six, destroy barnyard grass without toxicity to rice.

---

The present invention relates to a class of N-cyclohexyl dithiocarbamates and to herbicidal compositions and methods of destroying undesired vegetation employing the compounds. More particularly, the invention relates to methods for destroying barnyard grass in rice crops. In addition, the compounds are effective on a variety of grasses as hereinafter illustrated.

The compounds of this invention are esters represented by the general formula

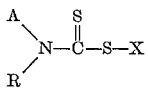

where A is cyclohexyl, R is allyl or an alkyl radical containing two or three carbon atoms, and X is allyl or an alkyl radical containing two, three, or four carbon atoms. The total carbon atoms of R and X are at least five. Preferably A is cyclohexyl, R is allyl, ethyl, propyl, or isopropyl, X is primary alkyl of three or four carbon atoms, and the sum of the carbon atoms in X and R is six. When R is ethyl, X is preferably isobutyl.

Representative examples of the new compounds are:

Allyl N-ethyldithiocyclohexanecarbamate
Allyl N-isopropyldithiocyclohexanecarbamate
Allyl N-propyldithiocyclohexanecarbamate
Ethyl N-isopropyldithiocyclohexanecarbamate
Ethyl N-propyldithiocyclohexanecarbamate
Propyl N-ethyldithiocyclohexanecarbamate
Isopropyl N-ethyldithiocyclohexanecarbamate
Allyl N-allyldithiocyclohexanecarbamate
Ethyl N-allyldithiocyclohexanecarbamate
Propyl N-propyldithiocyclohexanecarbamate
Butyl N-propyldithiocyclohexanecarbamate
Isopropyl N-propyldithiocyclohexanecarbamate
Isobutyl N-ethyldithiocyclohexanecarbamate
Butyl N-butyldithiocyclohexanecarbamate
Propyl N-allyldithiocyclohexanecarbamate
Isopropyl N-allyldithiocyclohexanecarbamate
Butyl N-allyldithiocyclohexanecarbamate
Isopropyl N-isopropyldithiocyclohexanecarbamate
Isobutyl N-isopropyldithiocyclohexanecarbamate
Butyl N-isopropyldithiocyclohexanecarbamate
Propyl N-isopropyldithiocyclohexanecarbamate Esters having the above general formulas are readily obtained by condensing an alkali metal salt of the corresponding N-cyclohexyldithiocarbamic acid with the desired alkyl halide.

EXAMPLE 1

As an illustration of a satisfactory procedure, a solution was prepared by dissolving 70.6 grams (0.5 mole) of N-propylcyclohexyl amine in 500 ml. of water containing 80 grams (0.5 mole) of 25% sodium hydroxide. To this solution, while agitating, was added dropwise at 5°–15° C. 38 grams (0.5 mole) of carbon bisulfide. After stirring for an hour at 25°–30° C., 62.5 grams (0.5 mole) of isopropyl bromide was added in one portion and the stirred reaction mixture heated at 50°–60° C. for 5 hours and at 25°–30° C. for 18 hours. After adding 500 ml. of ethyl ether and stirring for 15 minutes, the separated ether layer was washed with water until the washings were neutral to litmus and dried over sodium sulfate. The ether was removed in vacuo at a maximum temperature of 80°–90° C./1–2 mm. Isopropyl N-propyldithiocyclohexanecarbamate was obtained in 87.5% yield as an amber liquid analyzing 5.40% nitrogen and 24.63% sulfur as compared to 5.4% nitrogen and 24.72% sulfur calculated for $C_{13}H_{25}NS_2$.

Employing the same procedure and substituting the appropirate amine and alkyl halide, other products were prepared possessing the following physical properties:

EXAMPLE 2

Isobutyl N-ethyldithiocyclohexanecarbamate in 64.4% yield as an amber liquid. Analysis gave 5.35% nitrogen and 24.67% sulfur as compared to 5.40% nitrogen and 24.72% sulfur calculated for $C_{13}H_{25}NS_2$.

EXAMPLE 3

Propyl N-allyldithiocyclohexanecarbamate in 91.6% yield as an amber liquid. Analysis gave 5.42% nitrogen and 24.98% sulfur as compared to 5.44% nitrogen and 24.91% sulfur calculated for $C_{13}H_{23}NS_2$.

EXAMPLE 4

Isopropyl N-allyldithiocyclohexanecarbamate in 85% yield as an amber liquid. Analysis gave 5.31% nitrogen and 24.97% sulfur as compared to 5.44% nitrogen and 24.91% sulfur calculated for $C_{13}H_{23}NS_2$.

EXAMPLE 5

Butyl N-isopropyldithiocyclohexanecarbamate in 95.3% yield as an amber liquid. Analysis gave 5.0% nitrogen and 24.28% sulfur as compared to 5.12% nitrogen and 23.45% sulfur calculated for $C_{14}H_{27}NS_2$.

EXAMPLE 6

Propyl N-isopropyldithiocyclohexanecarbamate in 87.5% yield. The ether was removed in vacuo at a maximum temperature of 30° C./1–2 mm. and the product air-dried on paper at 25°–30° C. After recrystallization from heptane, the cream solid melted at 49°–50° C. Analysis gave 5.73% nitrogen and 24.65% sulfur as compared to 5.40% nitrogen and 24.72% sulfur calculated for $C_{13}H_{25}NS_2$.

EXAMPLE 7

Isopropyl N-isopropyldithiocyclohexanecarbamate in 89.5% yield. After addition of the isopropyl bromide and heating at 50°–60° C. for 5 hours and at 25°–30° C. for 18 hours, the product was colled to 5° C. and stirred at 0°–10° C. for 30 minutes. The precipitate was collected by filtration, washed with water until the washings were neutral to litmus, and air-dried at 25°–30° C. After recrystallization from heptane, the cream solid melted at 76°–77° C. Analysis gave 5.50% nitrogen and 24.10% sulfur as compared to 5.40% nitrogen and 24.72% sulfur calculated for $C_{13}H_{25}NS_2$.

EXAMPLE 8

Propyl N-propyldithiocyclohexanecarbamate in 98% yield as an amber liquid. After addition of the propyl bromide and heating at 50°–60° C. for 5 hours, the product was cooled to 25° C. and extracted with 500 ml. of ethyl ether. The separated ether solution was washed with water until the washings were neutral to litmus and dried over sodium sulfate. The ether was removed in vacuo at a maximum temperature of 80°–90° C./1–2 mm. Analysis gave 5.67% nitrogen and 24.56% sulfur as compared to 5.40% nitrogen and 24.72% sulfur calculated for $C_{13}H_{25}NS_2$.

The N-isopropylcyclohexyl amine used in the preparation of the dithiocarbamates of Examples 5, 6, and 7 may be prepared by the hydrogenation of N-isopropyl aniline. The intermediate, N-propylcyclohexyl amine, employed in Examples 1 and 8 was prepared as follows: To a stirred portion of cyclohexyl amine (9 moles, 900 grams), at 70° C. was added dropwise at 70°–110° C. in one hour, 369 grams (3.0 moles) of propyl bromide. The mixture was heated at 140°–150° C. for 4 hours, then cooled to 70° C. and 640 grams (4.0 moles) of 25% sodium hydroxide slowly added over a period of 10 minutes. After stirring for an hour, the product was filtered to remove by-product salt. The separated top layer was dried over potassium hydroxide and distilled at 760 mm. An 80% yield was obtained, B.P. 184°–186° C./760 mm.

Competition from barnyard grass is a major problem in the growing of rice. The new compounds of the present invention control all of the various barnyard grasses and especially *Echinochloa crusgalli*. As illustrative of the criticality of the nitrogen and sulfur substituents of the N-cyclohexyldithiocarbamates, it was observed that neither ethyl N-methyldithiocyclohexanecarbamate, nor methyl N - ethyldithiocyclohexanecarbamate, controlled barnyard grass, at least at economical dosages. On the other hand, ethyl N-ethyldithiocyclohexanecarbamate was toxic to a wide variety of grasses and exterted severe toxicity to both rice and barnyard grass. The commercial herbicide, 2-chloroallyl diethyldithiocarbamate, was severely toxic to rice at one pound per acre.

Herbicidal compositions containing the compounds of this invention are prepared as follows. The dithiocarbamate is admixed with a carrier material of the kind used and referred to in the art as a herbicidal adjuvant. This provides formulations adaptable for ready and efficient application in liquid or solid form. Solid compositions are formulated by mixing the toxicant with a finely divided or granular solid. Examples of such solids are talc, clay, pyrophyllite, silica, and fuller's earth. Liquid compositions are prepared by admixing the toxicant with a liquid diluent media. The toxicants are insoluble in water, but they are soluble in common organic solvents. They can be dispersed directly in water or dissolved first in an organic solvent and then dispersed. Examples of dispersing agents that can be used are soft or hard sodium or potassium soaps, alkylated aromatic sodium sulfonates such as sodium dodecylbenzene sulfonate, amine salts of dodecylbenzenesulfonic acid, alkali metal salts of sulfated fatty alcohols, and ethylene oxide condensation products of alkyl phenols or tall oil.

As illustrative of the selective properties possessed by the compounds of this invention, seeds of rice and barnyard grass were sown at one-half inch depth in Memphis silt loam in small square pots. The herbicidal compositions were applied by means of a belt sprayer at various dosages. One-half inch of over head irrigation was initially applied and sub-irrigation was used for subsequent wateriing requirements. The planted pots were next placed in a greenhouse maintained at about 75° F. Observations on the emergence and growth inhibition were made on approximately the 21st day after planting. The number of seeds emerging times an injury or vigor factor gave an indication of the effectiveness of the compound. The injury factor took into consideration any plants not expected to survive and evened irregularities of ratings on seeds which varied in percent germination. Thus, ratings were based on the number of plants which emerged and would survive as observed approximately 21 days after planting. Herbicidal ratings were assigned by means of the following conversion scale:

| Percent emergence | Phytotoxicity rating |
|---|---|
| 0–25 | Severe, 3. |
| 26–50 | Moderate, 2. |
| 51–75 | Slight, 1. |
| 76–100 | None, 0. |

The following phytotoxicity ratings were obtained by averaging the results of replicated tests:

TABLE I

| | | Herbicide ratings | |
|---|---|---|---|
| Active ingredient | Lbs./A. | Rice | Barn-yard grass |
| Propyl N-propyl-dithiocyclohexane-carbamate | 16 | 0 | 3 |
| | 8 | 0 | 3 |
| | 4 | 0 | 3 |
| Isopropyl N-propyl-dithiocyclohexane-carbamate | 16 | 0 | 3 |
| | 8 | 0 | 3 |
| | 4 | 0 | 3 |
| Isobutyl N-ethyl-dithiocyclohexane-carbamate | 16 | 0 | 3 |
| | 8 | 0 | 3 |
| | 4 | 0 | 3 |
| Isopropyl N-allyl-dithiocyclohexane-carbamate | 16 | 0 | 3 |
| | 8 | 0 | 3 |
| | 4 | 0 | 3 |
| Propyl N-isopropyl-dithiocyclohexane-carbamate | 16 | 0 | 3 |
| | 8 | 0 | 3 |
| | 4 | 0 | 3 |

The above data demonstrate that severalfold safety on upland rice was obtained with the N-cyclohexyldithiocarbamates of this invention. It was observed that propyl N - isopropyldithio-2-cyclohexenecarbamate possessed entirely different properties and was not toxic to barnyard grass.

Paddy-rice tests also pointed up the safety by use of the present compounds. Rice seeds of a transplanted variety were sown in Memphis silt loam in small square plastic pots. The rice was grown with sub-irrigation in a growth chamber for two weeks at 80° F. and 75% relative humidity until the plants averaged 6 to 9 inches in height and two to three leaves, at which time barnyard grass was sown at ⅛ to ¼" in depth. The pots were then placed in containers and flooded until at least ¼" head of water was estabmlished. The herbicides were applied by metering a total volume of 30 ml. (chemical solvent plus water) into the flooded pots. The head of water was allowed to recede for two days to allow germination of the barnyard grass, then the flooded head was re-established and maintained for two weeks. Data were collected two weeks after initiation. Herbicidal ratings were assigned by means of the conversion scale previously described. The following phytotoxicity ratings were obtained and are the average of replicated tests.

TABLE II

| Active ingredient | Lbs./A. | Herbicide ratings | |
|---|---|---|---|
| | | Rice | Barnyard grass |
| Isopropyl N-propyl-dithiocyclohexanecarbamate | 8 | 0 | 3 |
| | 4 | 0 | 3 |
| Isobutyl N-ethyl-dithiocyclohexanecarbamate | 8 | 0 | 3 |
| | 4 | 0 | 2 |
| Propyl N-allyl-dithiocyclohexanecarbamate | 8 | 0 | 3 |
| | 4 | 0 | 3 |
| | 2 | 0 | 3 |
| Isopropyl N-allyl-dithiocyclohexanecarbamate | 8 | 1.5 | 3 |
| | 4 | 0 | 3 |
| Butyl N-isopropyl-dithiocyclohexanecarbamate | 8 | 0 | 3 |
| | 4 | 0 | 2.5 |
| Propyl N-isopropyl-dithiocyclohexanecarbamate | 8 | 0 | 3 |
| | 4 | 0 | 3 |
| Propyl N-propyl-dithiocyclohexanecarbamate | 8 | 0 | 3 |
| | 4 | 0 | 3 |

Pre-emergence herbicides are applied to the soil surface before the plants emerge. The toxicants may be applied to the soil conveniently in the form of a spray containing the active ingredients in a concentration within the range of 0.1–10.0% by weight. The amount required for effective control of vegetation will vary, but amounts within the range of ¼ to 60 pounds per acre comprise the useful range under most conditions.

As illustrative of the control of other weedy grasses, the toxicants were applied as aqueous sprays to germinating seedlings of various grasses. In this manner, the active ingredient at the dosages shown, was applied to the soil of seeded plots before the plants emerged. About 14 days after application of the toxicants results were observed and recorded, employing the conversion scale described previously. The following phytotoxicity ratings were obtained at a dosage of 5lbs./acre.

TABLE III

| Active ingredient -dithiocyclohexanecarbamate | Wild oat | Rye grass | Fox-tail | Crab grass | Sorghum |
|---|---|---|---|---|---|
| Isopropyl-N-propyl- | 1 | 0 | 3 | 3 | 1 |
| Isobutyl-N-ethyl- | 2 | 2 | 3 | 3 | 3 |
| Butyl-N-butyl- | 3 | 3 | 3 | 3 | 3 |
| Propyl-N-allyl- | 3 | 1 | 3 | 3 | 3 |
| Isopropyl-N-allyl- | 1 | 0 | 3 | 3 | 2 |
| Butyl-N-allyl- | 2 | 2 | 3 | 3 | 2 |
| Isopropyl-N-isopropyl- | 1 | 2 | 3 | 3 | 3 |
| Isobutyl-N-isopropyl- | 1 | 2 | 3 | 3 | 3 |
| Butyl-N-isopropyl- | 2 | 2 | 3 | 3 | 2 |
| Propyl-N-isopropyl- | 3 | 2 | 3 | 3 | 3 |

It is intended to cover all changes and modifications of the examples of the invention herein chosen for purposes of disclosure which do not constitute departures from the spirit and scope of the invention.

What is claimed is:
1. The method for the selective control of weedy grasses in rice which comprises applying to the soil medium containing rice before the plants to be destroyed emerge a phytotoxic concentration of a compound of the formula

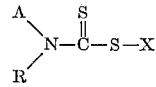

where A is cyclohexyl, R is allyl or alkyl of two or three carbon atoms, and X is allyl or alkyl of at least two but not more than four carbon atoms, the total number of carbon atoms in R and X being at least five.

2. The method of claim 1 where the weedy grasses include barnyard grass, R is ethyl, and X is isobutyl.

3. The method for the selective control of weedy grasses in rice which comprises applying to the soil medium containing rice before the plants to be destroyed emerge in a concentration toxic to weedy grasses, but not toxic to rice, a comopund of the formula

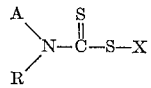

where A is cyclohexyl, R is alkenyl or alkyl of three carbon atoms, and X is alkyl of three carbon atoms.

4. The method of claim 3 where R and X are n-propyl.
5. The method of claim 3 where R is n-propyl and X is isopropyl.
6. The method of claim 3 where R is isopropyl and X is n-propyl.
7. The method of claim 3 wherein R and X are isopropyl.
8. The method of claim 3 where R is allyl and X is propyl.
9. The method of claim 3 where R is allyl and X is isopropyl.

References Cited
UNITED STATES PATENTS

| 3,288,782 | 11/1966 | D'Amico | 260—239 |
| 3,175,897 | 3/1965 | Tilles et al. | 71—100 |
| 2,895,980 | 7/1959 | Harman et al. | 71—101 |
| 2,941,879 | 6/1960 | Goodhue | 71—101 |
| 3,126,270 | 3/1964 | Harman et al. | 71—101 |

LEWIS GOTTS, Primary Examiner

C. L. MILLS, Assistant Examiner

U.S. Cl. X.R.
260—455